Dec. 8, 1931.  F. J. RODE  1,835,900

WELDING ROD

Filed Nov. 24, 1924

Inventor
Fredrich J. Rode,
By

Patented Dec. 8, 1931

1,835,900

UNITED STATES PATENT OFFICE

FREDRICH J. RODE, OF CHICAGO, ILLINOIS, ASSIGNOR, BY MESNE ASSIGNMENTS, TO KORO CORPORATION, OF WAUKEGAN, ILLINOIS, A CORPORATION OF ILLINOIS

WELDING ROD

Application filed November 24, 1924. Serial No. 751,981.

This invention relates to improvements in rods for use in welding or brazing and particularly to that type of rod which is fused by applied heat, the molten metal of the electrode being deposited upon and united with the parts to be welded, and one of the objects of the present invention is to provide an improved electrode of this character having cavities in its body opening through the face thereof for receiving covering material of a nature which will be charred by the flame and will fall away in particles following the fusing of the rod.

A further object is to provide an improved electrode of this character, portions of the surface of the body of which are covered by a protecting covering and other portions are uncovered and exposed, both the covered and the uncovered surfaces forming isolated areas, the uncovered portions rendering it possible, in electric welding to transmit current to the rod at various points throughout the length of the electrode.

During the fusing of the electrode and as the covering crumbles and falls away as the electrode is fused, it serves as a flux in the welding operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a side elevation of an electrode of this character constructed in accordance with the principles of this invention.

Throughout the specification and claims the term "cavity" will be employed to designate the space or opening which receives and retains the covering material, but it is to be understood that this is not to be considered a term of limitation, but it is to be construed broadly to include any form of opening, groove, depression, knurling, serrations, pocket or the like, which is formed in the electrode opening through the periphery thereof, and into which the covering material is placed.

Figure 1:
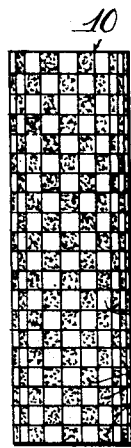
Figure 2:
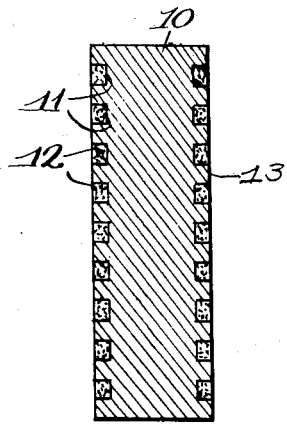
Figure 2 is a longitudinal sectional view of Figure 1.

Referring more particularly to the drawings, and in the form of the invention shown in Figures 1 and 2, the numeral 10 designates a metal rod or core having a plurality of cavities 11 arranged lengthwise of the electrode and opening through the face thereof. These cavities 11 are adapted to receive a covering material 12 which may be constructed of any suitable material which will burn or char under the flame of the arc and will crumble or fall away in particles as the rod or electrode is fused or is consumed and of such a material that it will serve as a flux for the welding operation.

The cavities are spaced from each other to form intermediate portions 13 which are exposed and renders it possible to connect or transmit current to the electrode at various points throughout the length of the electrode.

Figure 3:
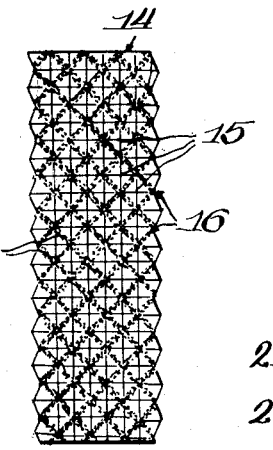
Figure 3 is another form of electrode.
Figure 4:
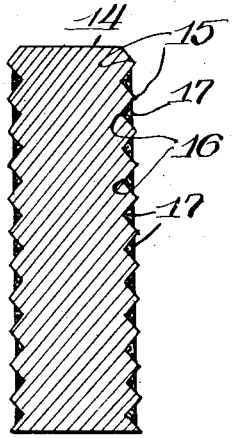
Figure 4 is a longitudinal sectional view of Figure 3.

In the form of the invention shown in Figures 3 and 4, the outer surface of the electrode 14 is knurled as at 15 and the spaces 16 intermediate the knurls constitute cavities for the reception of the covering material 17.

Figure 5:
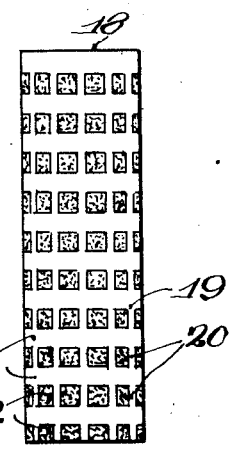
Figure 5 is an elevation of another form of electrode.

In the form of the invention shown in Figure 5, the electrode 18 is provided with cavities 19 spaced from each other and also spaced lengthwise of the electrode. The portions 20 of the electrode intermediate certain of the cavities 19 are exposed and the portions 21 of the electrode constitute rings about the electrode, which are spaced from each other in directions lengthwise of the electrode. Within the cavities 19 is placed a filling material 22 forming a covering for the portion of the electrode within the cavities.

In the form of the electrode 23 shown in

Figure 6:
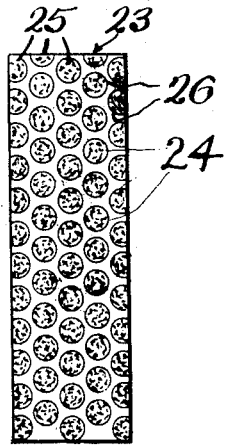
Figure 6 is an elevation of still another form of electrode.

Figure 6, the cavities 24 are of a circular configuration. These cavities receive a covering material 25 and the cavities are so arranged and spaced from each other as to form portions 26 which are uncovered and exposed, and these exposed portions render it possible to connect or transmit the current to the electrode at various points throughout the length of the electrode.

In each of the forms of the electrode herein shown, it will be manifest that the covered portions as well as the exposed portions of the electrode are isolated from each other, and in use and as the electrode is fused or consumed, the covering will be charred and will fall away and drop upon the work to form a flux for the welding operation With this form of electrode the flame of the arc will be centralized and will be directed around the end of the electrode by the covering material arranged in the pockets, thereby rendering it possible to control the flame and prevent the flame from spreading.

While the preferred forms of the invention have been herein shown and described and its use in connection with electric welding has been set forth, it is to be understood that various changes may be made in the details of construction and in the combination and arrangement of the several parts, within the scope of the claims, without departing from the spirit of this invention, and that the electrode may be used for brazing or other methods of welding, and in connection with any other heating medium, and for operations in which an electrode carrying a flux may be employed.

What is claimed as new is:—

1. A welding electrode comprising a rod having a solid centrally disposed core of substantial diameter extending throughout the length of the rod, a plurality of spaced indentations opening through the periphery of the rod, extending around the core and also lengthwise of the rod, said indentations being disconnected and separated from each other in directions circumferentially and also lengthwise of the rod, and fluxing material within and substantially filling the indentations, the peripheral surface of the rod between said indentations being bare.

2. A welding electrode comprising a rod having a solid centrally disposed core of subsantial diameter extending throughout the length of the rod, a plurality of spaced indentations opening through the periphery of the rod, extending around the core and also lengthwise of the rod, said indentations being disconnected and separated from each other in directions circumferentially and also lengthwise of the rod, and fluxing material within and substantially filling the indentations, the peripheral surface of the rod between said indentations being bare, the bottom of said indentations terminating considerably short of each other and of the diametric center of the rod.

3. A welding electrode comprising a rod having a solid centrally disposed core extending throughout the length of the rod, a plurality of spaced recesses opening through the periphery of the rod, extending around the core and also lengthwise of the rod, said recesses being disconnected and separated from each other in directions circumferentially and also lengthwise of the rod, and fluxing material within and substantially filling the recesses, the peripheral surface of the rod between said recesses being bare, the bottom of said recesses terminating considerably short of each other and of the diametric center of the rod, the core of the rod being of a uniform and substantial diameter throughout its length between planes extending lengthwise of the rod at the base of the recesses and parallel with the periphery of the rod.

4. A welding electrode comprising a rod having a solid centrally disposed core extending throughout the length of the rod, a plurality of spaced depressions opening through the periphery of the rod, extending around the core and also lengthwise of the rod, said depressions being disconnected and separated from each other in directions circumferentially and also lengthwise of the rod, and fluxing material within and substantially filling the depressions, the peripheral surface of the rod between said depressions being bare, the bottom of said depressions terminating considerably short of each other and of the diametric center of the rod, the core of the rod being of a uniform and substantial diameter throughout its length between planes extending lengthwise of the rod at the base of the depressions and parallel with the periphery of the rod, whereby when in use a shielded arc will be produced and the rod will burn towards the diametric center or axis of the rod, resulting in the formation of a cavity at the center of the rod to localize the arc.

In testimony whereof I have signed my name to this specification on this 12th day of November, A. D. 1924.

FREDRICH J. RODE.